United States Patent [19]

Ogawa

[11] 3,882,270

[45] May 6, 1975

[54] IMAGE TRANSMISSION SYSTEM

[75] Inventor: Mutsuo Ogawa, Tokyo, Japan

[73] Assignee: Ricoh Co., Ltd., Tokyo, Japan

[22] Filed: May 31, 1973

[21] Appl. No.: 365,479

[30] Foreign Application Priority Data

June 7, 1972 Japan .............................. 47-56755

[52] U.S. Cl. ...................... 178/7.1; 178/6; 178/7.6; 178/DIG. 2; 178/DIG. 3; 178/DIG. 27

[51] Int. Cl. .......................... H04n 1/04; H04n 1/40

[58] Field of Search ...... 178/6, 7.1, DIG. 2, DIG. 3, 178/DIG. 27, 7.6, 6.6 B

[56] References Cited

UNITED STATES PATENTS

| | | | |
|---|---|---|---|
| 3,210,462 | 10/1965 | Trott | 178/DIG. 2 |
| 3,240,106 | 3/1966 | Hicks | 178/DIG. 2 |
| 3,393,269 | 7/1968 | Zeuthen | 178/6.6 B |
| 3,609,229 | 9/1971 | Mosca | 178/DIG. 3 |
| 3,697,683 | 10/1972 | Gates | 178/7.1 |
| 3,699,446 | 10/1972 | Sainte-Beuve | 178/DIG. 3 |
| 3,715,498 | 2/1973 | Haynes | 178/7.1 |
| 3,739,084 | 6/1973 | Heinrich | 178/DIG. 3 |
| 3,770,910 | 11/1973 | Rose | 178/DIG. 2 |

*Primary Examiner*—Howard W. Britton
*Attorney, Agent, or Firm*—Cooper, Dunham, Clark, Griffin & Moran

[57] ABSTRACT

A system for converting optical images into digital image signals characterized by low redundancy and for transmitting said digital signals. An image is scanned at a low sensitivity level for the first scanline, a high sensitivity level for the second scanline, a low sensitivity level for a third scanline, etc., to generate a succession of analog image signals each corresponding to a single scanline. Each of the analog image signals is compared with a threshold level signal which alternates, in square wave fashion, between two different threshold levels many times during a single scanline. the comparison results in a transmission signal which is at 0 when the analog image signal is within a first theshold span, which alternates between 0 and 1 when the analog image signal is within a second threshold interval, and which is at a steady 1 when the analog image signal is within a third threshold interval.

10 Claims, 7 Drawing Figures

IMAGE TRANSMISSION SYSTEM

BACKGROUND OF THE INVENTION

The invention is in the field of image transmission systems for half tone pictorial information.

In one type of prior art image transmission systems, the image is converted into analog image signals with voltage level corresponding to the density of the image. This type requires a very wide transmission frequency band. In another type of prior art image transmission systems, the image is scanned and each scan line is converted to a binary coded sequence of density values. This type requires a narrower transmission frequency band, but transmission time is relatively high because of the high redundancy of the binary code. It is desirable therefore to provide an image transmission system which utilizes a narrow transmission frequency band and reduces the transmission time by reducing the redundancy of the digital information representing the image.

SUMMARY OF THE INVENTION

The invention is in the field of image transmission systems. Its object is to provide an image transmission system which allows the use of a narrow frequency band for transmission and which reduces the transmission time by reducing the redundancy of the transmitted information.

This and other objects of the invention are accomplished by scanning an image at a repeating plurality of sensitivity levels to generate a succession of image signals each corresponding to a scan at a single sensitivity level. For each of these scans, a repeating plurality of threshold level signals is generated in timed relationship with the image signal. The image signal level is compared with the threshold level signals in a timed relationship and a first transmission signal is generated during the times when the image signal level is higher than the time related threshold level signal, while a second transmission signal is generated for the times when the image signal level is lower than the threshold level signal.

In a specific embodiment, successive lines of an image are scanned at two alternating sensitivity levels, for example, the first line of the image is scanned at a high sensitivity level, the second line is scanned at a low sensitivity level, the third line is scanned at a high sensitivity level, etc. A threshold level signal is generated for the duration of each scan line. The threshold level signal alternates, in a square wave fashion, between two threshold levels. The image signals of each scan line, which are in analog form, are compared with the threshold level signal. A transmission signal is generated from the comparison and this transmission signal is at a high level when the image signal is at a higher level than the threshold level signal and at a low level when the image signal is at a lower level than the threshold level signal. The resulting transmission signal is in a novel type of code which reduces redundancy and thus reduces the time necessary for transmitting a given image over a transmission frequency band of a given width.

DETAILED DESCRIPTION

Figure 1:
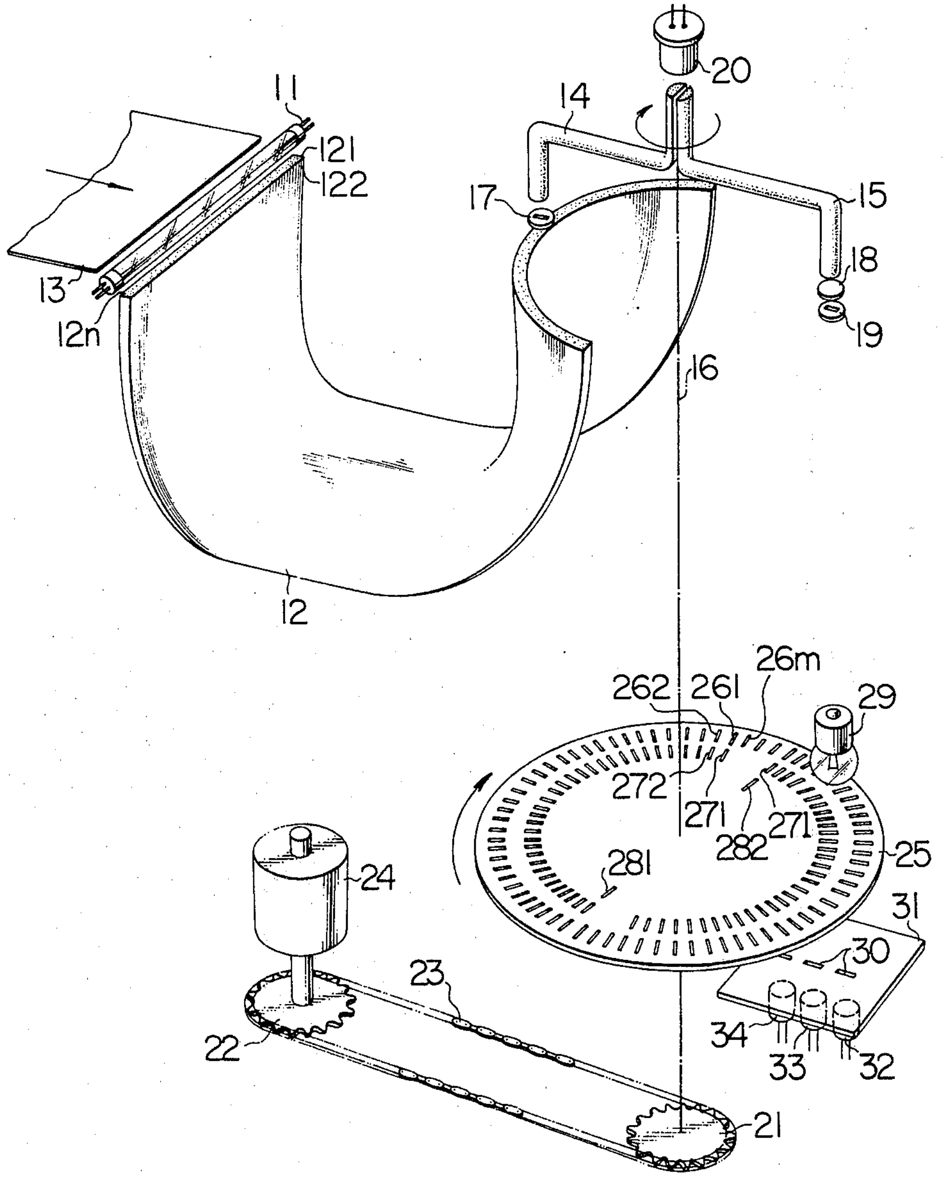
FIG. 1 is a schematic perspective view of an image transmission system embodying the invention.

Referring to FIG. 1, a graphic material 13 carrying an image is scanned line by line to generate image signals originating at a photoelectric transducer element 20. Concurrently, threshold level signals are generated at photoelectric transducer elements 32, 33, and 34.

The graphic material 13 moves in the direction of the shown arrows between a lamp 11 and the left-hand end of a fiber optic bundle 12. The right-hand end of the fiber optic bundle 12 is an arc of less than 180°, and the lower end of each of fiber optic bundles 14 and 15 rotate over it about a rotary shaft 16. The upper ends of the fiber optic bundles 14 and 15 face the photoelectric transducer element 20. The fiber optic bundle 12 comprises a number of light transmission paths 121, 122, . . . , 12$n$ and the ends of the light transmission path are ordered in the same manner at both ends of the fiber optic bundle 12. A slit member 17 is suitably affixed to the lower end of the fiber optic bundle 14 and moves it, while a slit member 19 is similarly affixed to the lower end of the fiber optic bundle 15 and a filter 18 is secured between the slit member 19 and the lower end of the fiber optic bundle 15.

As the graphic material 13 moves rightwardly, along the shown arrow, in a primary scanning motion, the secondary scanning motion is the rotation of the fiber optic bundles 14 and 15. Each time the fiber optic bundle 14 moves over the arc defined by the right-hand end of the firber optic bundle 12, one line of the graphic material 13 is scanned. The next line of the graphic material 13 is similarly scanned by the fiber optic bundle 15. The amount of light which reaches the fiber optic bundles 14 and 15 at any instant of time through the light transmission paths of the fiber optic bundle 12 is a function of the density of the image on the graphic material 13. Thus, the photoelectric transducer element 20 can generate an analog signal whose voltage level varies as a function of the density of the image on the graphic material 13.

Because of the filter 18, the sensitivity level of the photoelectric transducer element 20 alternates. When the fiber optic bundle 14 is over the fiber optic bundle 12, the photoelectric transducer element 20 generates an image signal at a high sensitivity level. While the fiber optic bundle 15 is over the right-hand end of the fiber optic bundle 12, the filter 18 reduces the light intensity, and the image signal generated by the photoelectric transducer element 20 is at a low sensitivity level.

Referring to the lower portion of FIG. 1, a timing disc 25 rotates at the same speed as the fiber optic bundles 14 and 15 about the same rotary shaft 16. The timing disc 25, as well as the fiber optic bundles 14 and 15 are driven by means of the rotary shaft 16, which in turn is driven by an arrangement comprising a sprocket wheel 21 affixed to the rotary shaft 16, a chain 23 trained over the sprocket wheel 21 and another sprocket wheel 22, and a motor 24 having a shaft affixed to the sprocket wheel 22.

The timing disc 25 has an annular row of programming slots **261, 262, . . . , 26*m* which serve as timing slots, and two rows of image sampling slots 271, 272, . . . , 271 which are disposed radially inwardly of the programming slots. Each of the rows of image sampling slots corresponds in angular extent to the angular extent of the right-hand end of the fiber optic bundle 12. Additionally, the timing disc 25 has a pair of slots 281 and 282 to indicate the bounds of a scan line. Programming and timing signals are derived from the timing disc 25 by a lamp 29 and photoelectric transducers 32, 33 and 34. The transducer 32 provides a square wave shaped signal, the transducer 33 provides a similar square wave shaped signal but only while the lower end of either one of the fiber optic bundles 14 and 15 is over the right-hand end of the fiber optic bundle 12, and the transducer 34 provides a signal at the start of a scan line, i.e., when the the lower end of either one of the fiber optic bundles 14 or 15 first reaches the right-hand end of the fiber optic bundle 12.**

Figure 3:
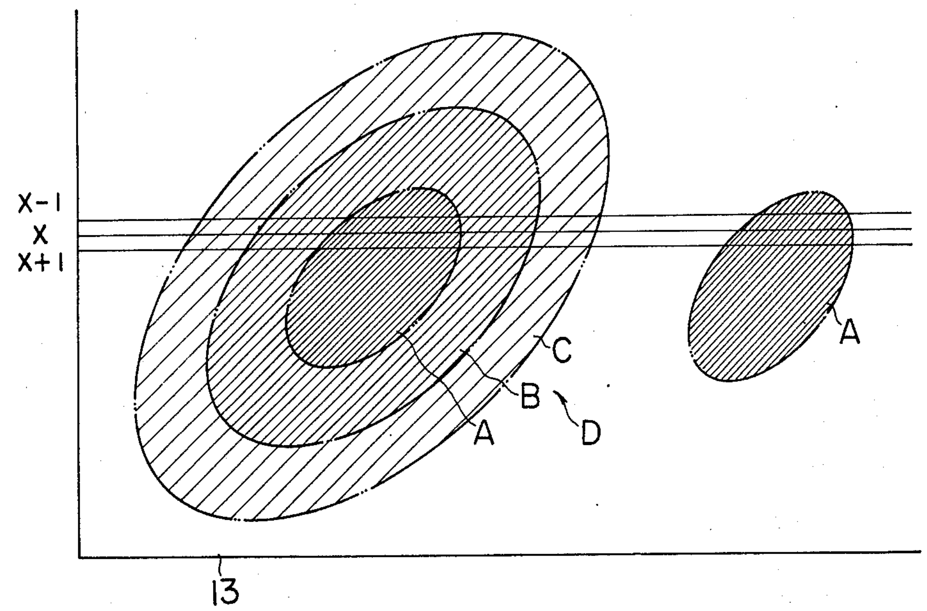
FIG. 3 is a plan view of an image which is to be transmitted by the system shown in FIGS. 1 and 2.

As an example of the operation of the system shown in FIG. 1, suppose that the graphic material 13 carries an image of the type shown in FIG. 3. In FIG. 3, the image comprises protions A which are darkest, a portion B which is somewhat lighter, and a portion C which is lightest in density. The image is scanned along three successive scan lines designated X−1, X and X+1. Assume that the line X−1 is scanned with the fiber optic bundle 14 (at the high sensitivity level), while the line X is scanned by the fiber optic bundle 15 (at the low sensitivity level) and the line X+1 is again scanned by the fiber optic bundle 14.

Figure 4:
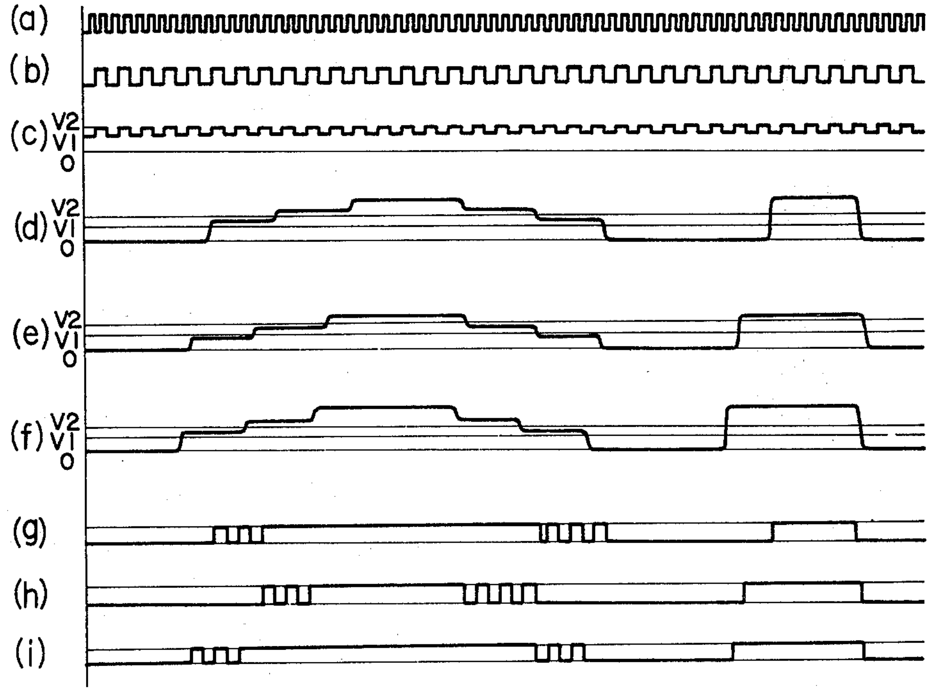
FIG. 4 illustrates wave forms utilized in the system of FIGS. 1 and 2.

Referring to FIG. 4, the transducer 33 of FIG. 1 generates the image signal sampling pulses shown as the curve a in FIG. 4, and the photoelectric transducer element 20 of FIG. 1 generates the curve d in FIG. 4 for the X−1 scan line of FIG. 3, the curve e of FIG. 4 for the scan line X of FIG. 3, and the curve f of FIG. 4 for the X+1 scan line of FIG. 3.

Figure 2:
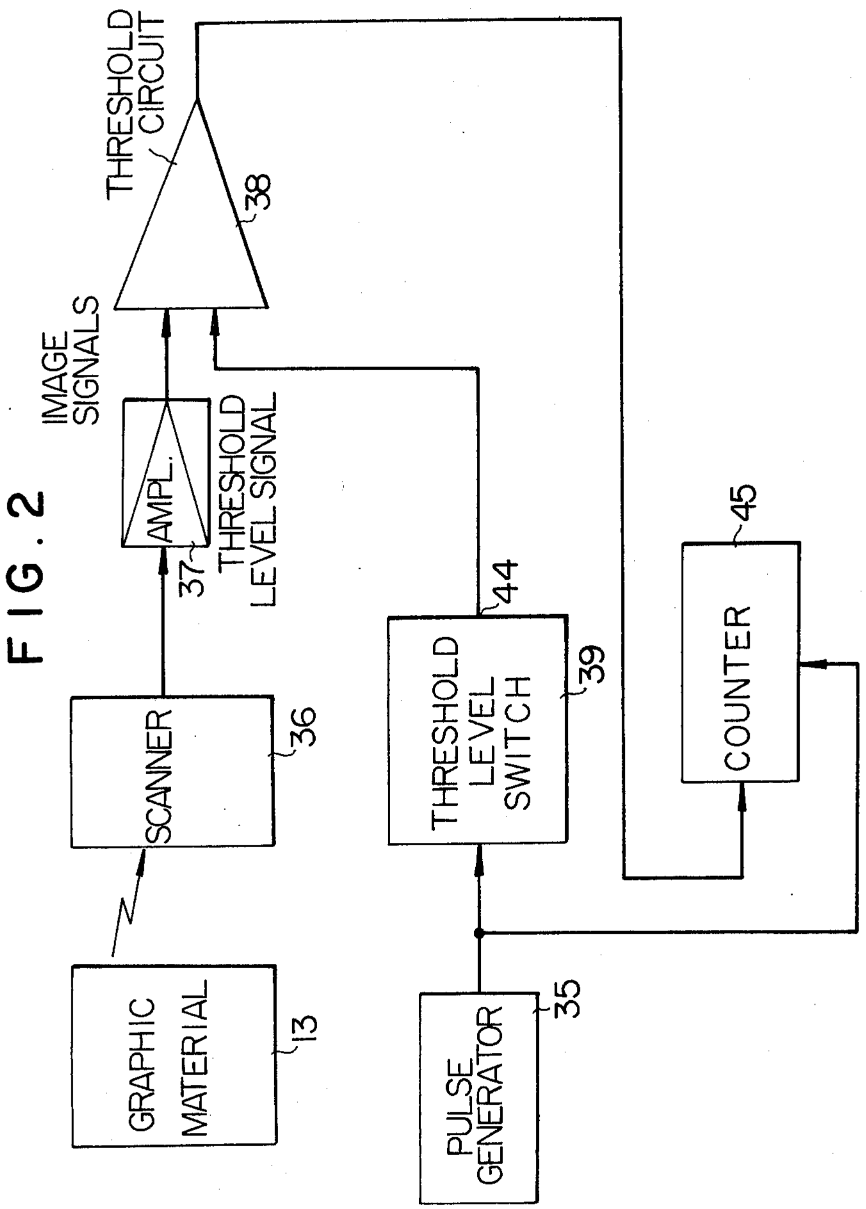
FIG. 2 is a functional block diagram of the system shown in FIG. 1.

Referring to FIG. 2, a scanner 36 comprises the elements identified by the reference numerals 11, 12, and 14 through 24 in FIG. 1, and provides at its output the wave forms illustrated by curves *d*, *e*, and *f* of FIG. 4. The output of the scanner 36 is suitably amplified by an amplifier 37 whose output is a sequence of image signals, each image signal resulting from one scan line.

Still referring to FIG. 2, a pulse generator 35 comprises the elements identified by the reference numerals 271, 29, 30, 32, 33 and 34 in FIG. 1, and provides at its output the image signal sampling pulse train illustrated at curve a of FIG. 4. The output of the pulse generator 35 is applied to a threshold level switch 39, which may be a suitaby biased flip-flop, whose output is the threshold voltage curve c in FIG. 4. The biasing of the threshold level switch 39 is such that the threshold level voltage curve c of FIG. 4 alternates in voltage level between the values V1 and V2 in a square wave fashion at half the frequency of the pulse train from the generator 35. The image signals from the threshold level switch 39 are applied to a threshold circuit 38, which may be a differential amplifier. The output of the threshold circuit 38 is at either a high level or at a low level: it is at a high level when the voltage level of the image signal is higher than that of the threshold level signal, and it is at a low level when the voltage level of the image signal is lower than that of the threshold level signal.

When the line X−1 is scanned (at a high sensitivity level) and the output of the amplifier 37 of FIG. 2 is the curve *d* of FIG. 4, the image signal illustrated by the curve *d* in FIG. 4 is compared with the threshold level signal illustrated by the curve *c* of FIG. 4 by the threshold circuit 38, and the result is the wave form illustrated by the curve *g* in FIG. 4. Specifically, at the instances when the voltage level of the curve *d* of FIG. 4 is lower than the voltage level of the curve *c*, the curve *g* is at a low level, and, for the instances when the voltage level of the curve *d* is higher than the voltage level of the curve *c*, the curve *g* is at a high level.

The X line is scanned at the low sensitivity level, and hence, the voltage level of the curve e of FIG. 4 is lower than that of curve *d.* The comparason between the curve *e* and the curve *c* of FIG. 4 (which is carried out by the threshold circuit 38 of FIG. 2) therefore yields a wave form of the type shown at the curve *h* in FIG. 4.

When the curve *f* of FIG. 4 (which is obtained at the high sensitivity level) is compared with the curve *c*, the result is the curve *i* in FIG. 4.

The output of the threshold circuit 38 of FIG. 2 is a succession of wave forms of the type illustrated by the curves *g*, *h*, and *i* of FIG. 4, and it is applied to a counter 45 and is gated to the counter by the output of the pulse generator 35. The contents of the counter 45 are signals ready for transmission or further processing. For example, the output of the threshold circuit 38 for each scan line may be gated out of the counter 45 upon the occurrence of the pulses from the photoelectric transducer 34 of FIG. 1.

Figure 5:
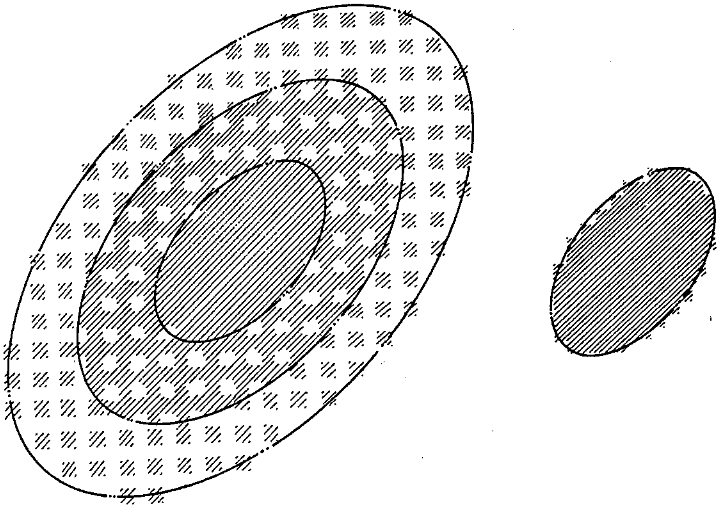
FIG. 5 shows an image recorded in accordance with the system of FIGS. 1 and 2.

The output of the counter 45 may be recorded by a suitable facsimile recorder to obtain an image of the type shown in FIG. 5. The image of FIG. 5 results from recording at high density for the high portions of the output of the counter 45 and recording at a low density or at zero density for the low output of the counter 45.

Figure 6:
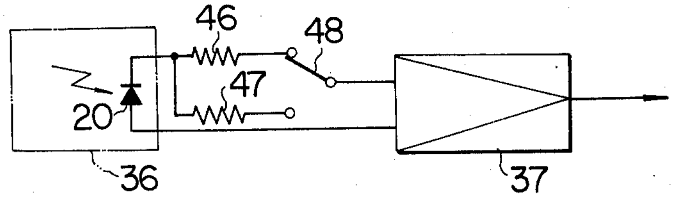
FIGS. 6 and 7 are partial views of the system of FIGS. 1 and 2.

If the filter 18 of FIG. 1 is eliminated, scanning successive lines of the graphic material 13 at alternating sensitivity levels may be effected by introducing between the scanner 36 and the amplifier 36 of FIG. 2 a circuit of the type illustrated in FIG. 6. Referring to FIG. 6, the circuit comprises resistors 46 and 47 which differ in value and a switch 48 which alternately connects the scanner 36 to the amplifier 37 through the resistors 46 and 47. The switch 48 is operated in a conventional manner by means of the signals generated from the photoelectric transducer 34 in FIG. 1. The photoelectric transducer 34 in FIG. 1 generates a signal once at the beginning of each scan line. Therefore, the scanner 36 of FIG. 6 is connected to the amplifier 37 through, for example, the resistor 46 for one scan line, through the resistor 47 for the next scan line, through the resistor 46 for the next following scan line, etc. In this fashion, the filter 18 of FIG. 1 may be eliminated, and the difference in the sensitivity level may be defined by appropriately choosing different values for the resistors 46 and 47 of FIG. 6. A network of the type shown in FIG. 6 and consisting a similar pair of resistors and a switch may be introduced between the threshold level switch 35 and the amplifier 38 to effect a properly biased train of signals of the type shown at curve *c* of FIG. 4.

Figure 7:
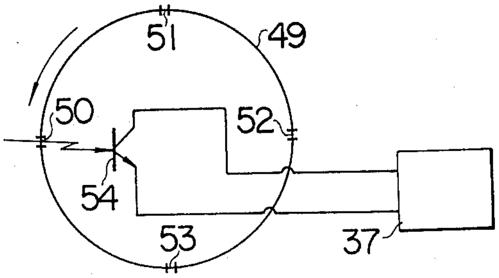

Another alternate means for effecting scanning of successive lines at a plurality of repeating sensitivity levels is illustrated in FIG. 7 and comprises a rotating drum 49 having at its circumference a plurality of filters 50, 51, 52, and 53 and enclosing a photoelectric transducer element 54 whose output is applied to an amplifier 37 of the type shown in FIG. 2. The drum 49 of FIG. 7 is disposed near a reflector (not shown) for displaying the image of a graphic material and the rotional speed of the drum 49 is synchronized with the timing disc 25 of FIG. 1 such that each of the filters 50, 51, 52, and 53 scans a single line of the graphic material.

While only two sensitivity levels have been discussed in connection with FIGS. 1 through 6 and a threshold level signal of only two voltage levels has been discussed, it should be clear that a plurality of sensitivity levels and a plurality of levels of the threshold level signal are possible within the teachings of this invention.

I claim:

1. An image transmission system comprising means for scanning an image at a repeating plurality of sensitivity levels to generate a sequence of image signals, each image signal corresponding to a scan at a single one of said sensitivity levels;

means for generating a threshold level signal comprising a repeating plurality of threshold levels in timed relationship with each of said image signals; and means for comparing each image signal with said threshold level signal to generate a first transmission signal when the level of the image signal is higher than the time related level of the threshold level signal and for generating a second transmission signal when the level of the image signal is lower than the time related level of the threshold level signal.

2. A system as in claim 1 wherein the means for generating the threshold level signal comprises a timing disc having a plurality of slits, a light source and a plurality of photoelectric transducer elements separated by the timing disc, means for rotating the disc with respect to the light source and the photoelectric transducer element and a threshold level switch receiving the output of at least one of said photoelectric transducer elements and providing an output which is a voltage signal alternating between a repeating plurality of threshold levels in timed relationship with each of said image signals.

3. A systme as in claim 1 wherein the scanning means scans the image at an alternating plurality of a higher and a lower sensitivity level.

4. A system as in claim 3 wherein the threshold level signal generating means generates a signal alternating between two levels.

5. A system as in claim 1 wherein the scanning means comprises a fiber optic bundle having an image entry end and an image exit end shaped in the form of a semicircle having an arc of up to 180°, means for moving the image with respect to the entry end of the fiber optic bundle and for projecting the image onto said entry end, and means for converting the intensity of the image emerging at the exit end of the fiber optic bundle to an electrical signal whose voltage level varies with the intensity of the image.

6. A system as in claim 5 wherein the converting means comprises a photoelectric transducer element and a second fiber optic bundle having an image entry end rotating over said semicircularly shaped exit end and having an exit end facing said photoelectric transducer element.

7. An image transmission system comprising:

means for scanning an image at a repeating plurality of sensitivity levels, one sensitivity level per scan line, to generate a succession of image signals each corresponding to a scan of one line;

means for generating a threshold level signal alternating between a repeating plurality of threshold levels in timed relationship with each of said image signals;

threshold circuit means for comparing the instantaneous relative levels of the image signal and of the threshold level signal and for generating a first transmission signal at a first defined relationship between the compared signals and a second transmission signal at a second defined relationship between the compared signals; and a counter receiving the output of the threshold circuit and storing said output as a coded representation of the scanned image.

8. An image transmission system comprising:

a. means for scanning an image to generate a succession of image signals each corresponding to a scan of one line of the image;

b. means for generating a threshold level signal alternating between a plurality of threshold levels at a frequency substantially greater than that of generating said image signals; and c. means for comparing each image signal with the threshold level signal and for generating a first transmission signal at a first defined relationship between the compared signals, a second transmission signal at a second defined relationship between the compared signals and a third transmission signal at a third defined relationship between the compared signals.

9. An image transmission system as in claim 8 wherein the scanning means inludes means for scanning selected different lines of the image at selected different sensitivity levels.

10. an image transmission system as in claim 8 wherein the means for generating a threshold level signal generates selected different threshold level signals for selected different image signals.

* * * * *